United States Patent
Park et al.

(10) Patent No.: US 12,470,491 B2
(45) Date of Patent: Nov. 11, 2025

(54) COMMUNICATING PRECEDENCE USING VEHICLE TO EVERYTHING (V2X) MESSAGES

(71) Applicant: Motional AD LLC, Boston, MA (US)

(72) Inventors: Junho Park, Seven Fields, PA (US); Hahkrel Noh, Brookline, MA (US); Jungnam Bae, Mars, PA (US)

(73) Assignee: Motional AD LLC, Boston, MA (US)

( * ) Notice: Subject to any disclaimer, the term of this patent is extended or adjusted under 35 U.S.C. 154(b) by 99 days.

(21) Appl. No.: 18/378,951

(22) Filed: Oct. 11, 2023

(65) Prior Publication Data

US 2024/0129248 A1    Apr. 18, 2024

Related U.S. Application Data

(60) Provisional application No. 63/436,319, filed on Dec. 30, 2022, provisional application No. 63/416,446, filed on Oct. 14, 2022.

(51) Int. Cl.
*H04L 47/2475* (2022.01)
*H04W 4/40* (2018.01)

(52) U.S. Cl.
CPC ........... *H04L 47/2475* (2013.01); *H04W 4/40* (2018.02)

(58) Field of Classification Search
CPC ........................... H04L 47/2475; H04W 40/00
(Continued)

(56) References Cited

U.S. PATENT DOCUMENTS

| 11,851,053 B2 * | 12/2023 | Szalai | G01C 21/3492 |
| 2014/0278029 A1 * | 9/2014 | Tonguz | G08G 1/161 |
| | | | 701/117 |

(Continued)

FOREIGN PATENT DOCUMENTS

| DE | 102016123427 A1 * | 6/2017 | ............ B60Q 9/008 |
| EP | 3982691 A1 * | 4/2022 | ............ H04B 17/25 |
| GB | 2557426 | 6/2018 | |

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
(Continued)

*Primary Examiner* — Ruolei Zong
(74) *Attorney, Agent, or Firm* — Fish & Richardson P.C.

(57) ABSTRACT

Provided are methods for communicating precedence using vehicle to everything (V2X) messages, which include broadcasting at least one outgoing message associated with an upcoming intersection, and receiving at least one incoming message to at least one other vehicle approaching the upcoming intersection. Some methods described also include determining a priority conflict exists, and updating the respective priority number based on the respective stopped time and the at least one other stopped time. Some methods described also include updating the respective conflict flag based on the updated respective priority number, and determining whether the priority conflict exists based on the updated respective conflict flag. Some methods described also include determining a consensus priority order in response to determining that the priority conflict does not exist. Systems and computer program products are also provided.

22 Claims, 8 Drawing Sheets

(58) Field of Classification Search
USPC .......................................................... 709/238
See application file for complete search history.

(56) References Cited

U.S. PATENT DOCUMENTS

| | | | |
|---|---|---|---|
| 2017/0166124 A1* | 6/2017 | Nakagawa | G08G 1/163 |
| 2017/0197549 A1* | 7/2017 | Vladimerou | B60W 30/08 |
| 2019/0130739 A1 | 5/2019 | Khedkar et al. | |
| 2020/0027342 A1* | 1/2020 | Shimizu | G08G 1/096725 |
| 2020/0372793 A1* | 11/2020 | Weizman | G08G 1/0112 |
| 2021/0082297 A1 | 3/2021 | Jacobus et al. | |
| 2021/0289326 A1* | 9/2021 | Weinfield | G08G 1/096716 |
| 2022/0080959 A1* | 3/2022 | Szalai | G08G 1/096725 |
| 2022/0084399 A1 | 3/2022 | Hehn et al. | |
| 2022/0084405 A1* | 3/2022 | Zhang | G08G 1/096775 |
| 2022/0116942 A1* | 4/2022 | Fouad | H04W 56/0015 |
| 2022/0180749 A1* | 6/2022 | Narushima | G08G 1/163 |
| 2023/0249693 A1* | 8/2023 | Mukundan | G06V 40/193 |
| | | | 340/425.5 |

OTHER PUBLICATIONS

Boumiza et al., "Intrusion Threats And Security Solutions For Autonomous Vehicle Networks," 2017 IEEE/ACS 14th International Conference on Computer Systems and Applications, Oct. 30, 2017, pp. 120-127.

International Search Report and Written Opinion in International Appln. No. PCT/US2023/034803, mailed on Jan. 26, 2024, 19 pages.

International Preliminary Report on Patentability in International Appln. No. PCT/US2023/034803, mailed on Apr. 24, 2025, 12 pages.

\* cited by examiner

COMMUNICATING PRECEDENCE USING VEHICLE TO EVERYTHING (V2X) MESSAGES

CROSS-REFERENCE TO RELATED APPLICATIONS

The present application claims priority from U.S. Provisional Application No. 63/416,446, filed on Oct. 14, 2022 and U.S. Provisional Application No. 63/436,319, filed on Dec. 30, 2022, both of which are incorporated by reference.

BACKGROUND

Vehicles navigate through an environment with varying levels of autonomous functionality. The vehicles are configured to communicate with other vehicles, systems, or infrastructure. The communications are sent and received by vehicles as they navigate through the environment.

DETAILED DESCRIPTION

Figure 1:
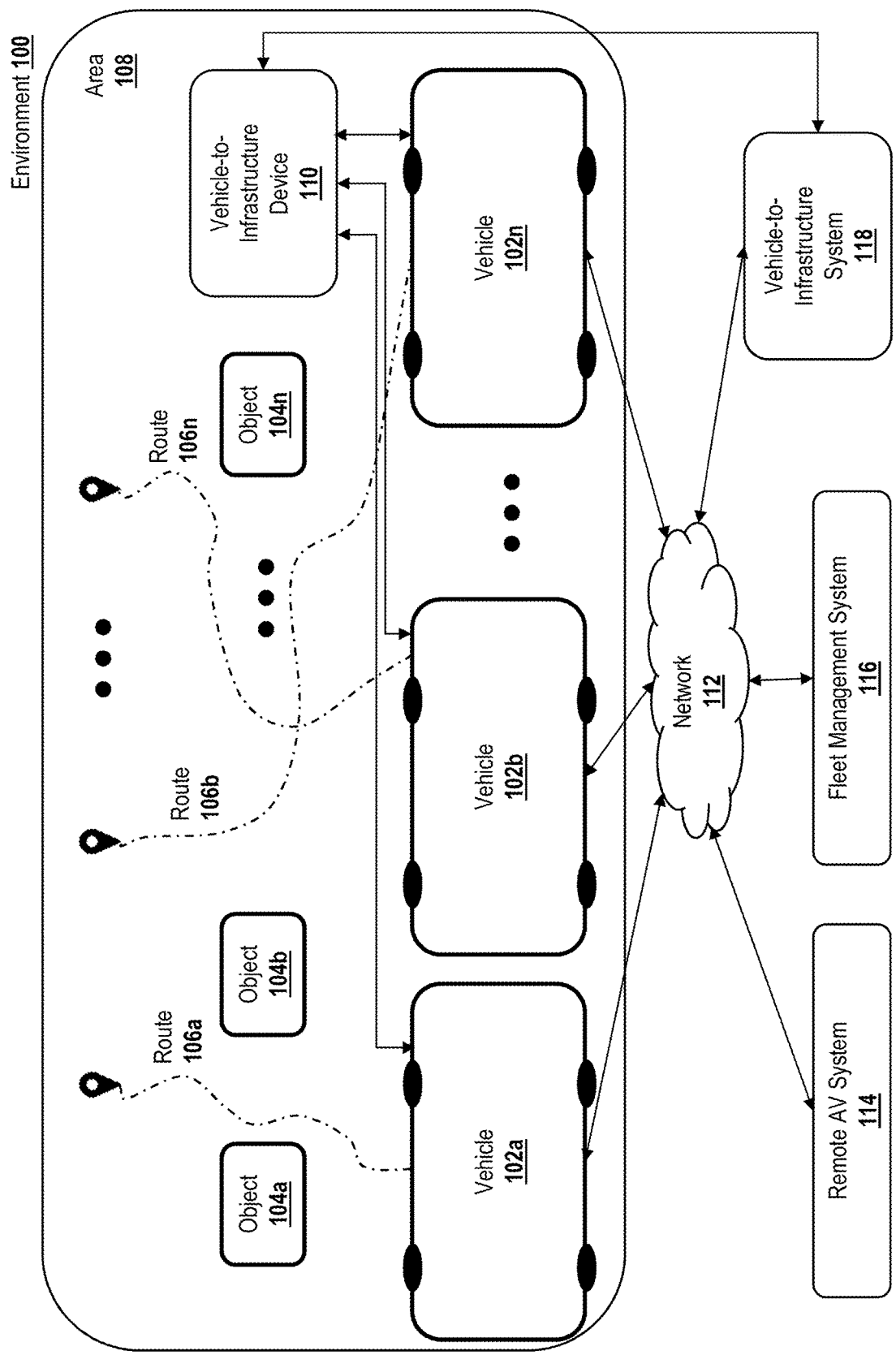
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a vehicle (such as an autonomous vehicle) that travels along a route to a destination. While traveling along the route, the vehicle may approach an intersection at the same time or substantially the same time as other vehicles. The vehicle transmits a message (V2X) including the vehicle's priority number, a stopped time, and a conflict flag (initially indicating conflicts haven't been checked). The vehicle receives messages from other vehicles approaching the same intersection. The received messages include a priority number, a stopped time, and a conflict flag of each of the other vehicles. The vehicle determines whether a priority conflict exists either by determining a conflict itself (e.g., the vehicle's priority number conflicts with another priority number) or by receiving a conflict flag indicating a conflict. If there is a conflict, the vehicle updates its priority number based on its stopped time and the stopped times received from the other vehicles. The vehicle then compares its updated priority numbers to the priority numbers received from the other vehicles, and the vehicle updates its conflict flag accordingly. The vehicle then determines if the conflict still exists based on its own comparison and conflict flags received from other vehicles. When the conflict no longer exists, the vehicle determines a consensus priority order to traverse the intersection safely.

By virtue of the implementation of systems, methods, and computer program products described herein, techniques for communicating precedence using V2X messages provide advantages including deciding a fair consensus priority order for vehicles to traverse an intersection using only the vehicles' own priority determinations. The vehicles communicate their priority determinations directly with each other using vehicle to vehicle messages, and negotiate a fair precedence. In addition, the vehicles clearly confirm that they have the same precedence order through the bidirectional communications. Furthermore, the vehicles can identify other vehicles trying to interject incorrect priority. The cooperating vehicles can ignore priority information from the adversarial vehicle when it is safe to do so, or yield to the adversarial vehicle to avoid unnecessary risks.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
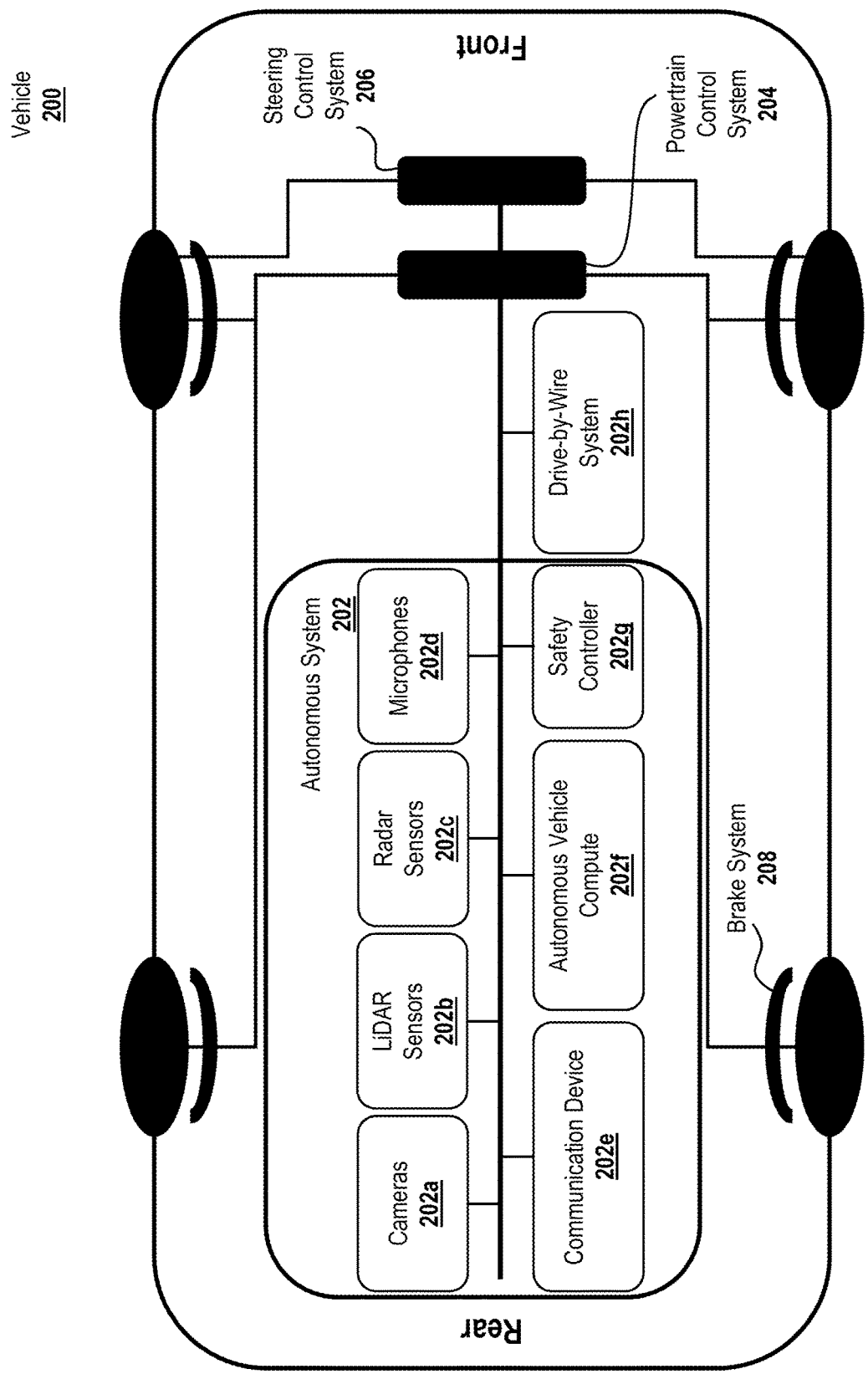
FIG. 2 is a diagram of one or more systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
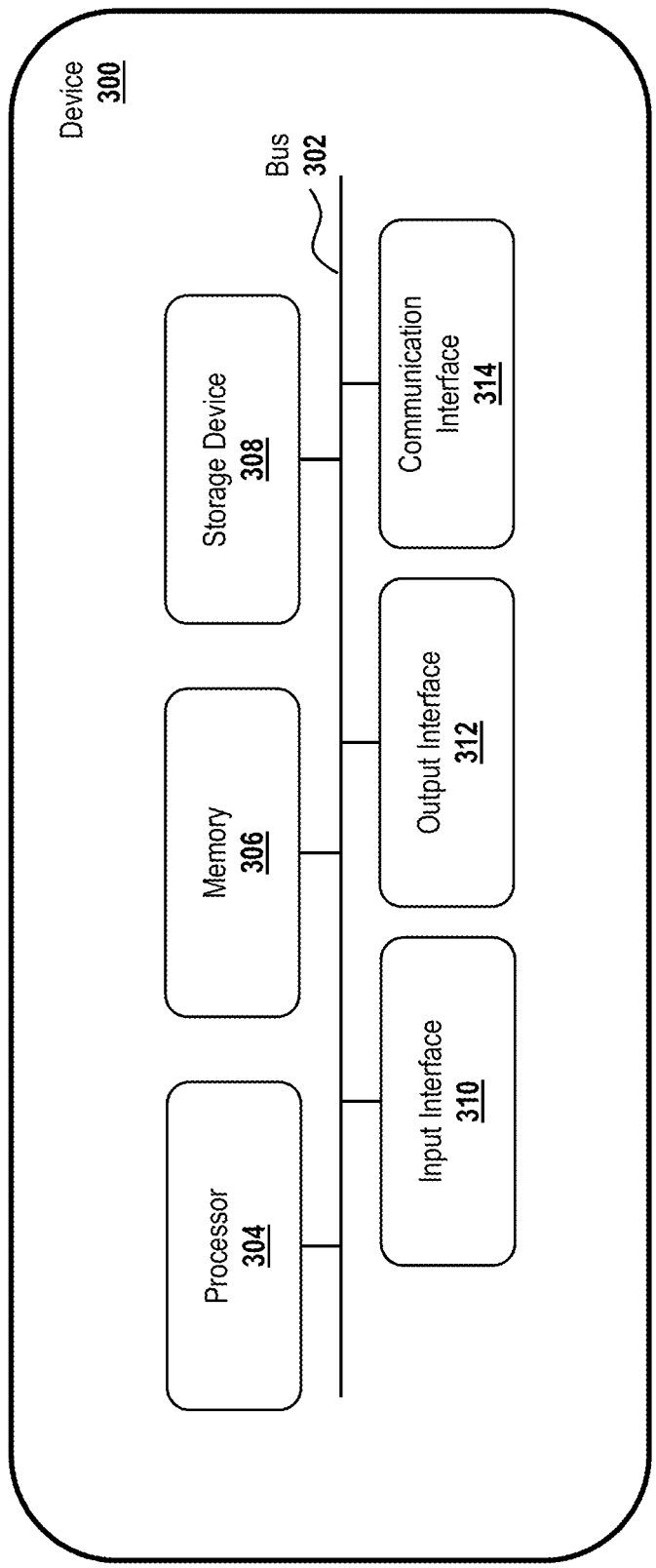
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of a V2I device (e.g., a V2I device that is the same as or similar to V2I device 110 of FIG. 1), a V2I system (e.g., a V2I system that is the same as or similar to V2I system 118 of FIG. 1), at least one autonomous vehicle system (e.g., an autonomous vehicle system that is the same as or similar to autonomous vehicle compute 202f of FIG. 2), at least one communication device (e.g., a communication device that is the same or similar to communication device 202e of FIG. 2), and/or one or more devices of network 112 (e.g., one or more devices of a system of network 112). In some embodiments, one or more devices of vehicles 102 (e.g., one or more devices of a system of vehicles 102), one or more devices of a V2I device (e.g., a V2I device that is the same as or similar to V2I device 110 of FIG. 1), one or more devices of a V2I system (e.g., a V2I system that is the same as or similar to V2I system 118 of FIG. 1), one or more autonomous vehicle systems (e.g., an autonomous vehicle system that is the same as or similar to autonomous vehicle compute 202f of FIG. 2), one or more communication devices (e.g., a communication device that is the same or similar to communication device 202e of FIG. 2), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
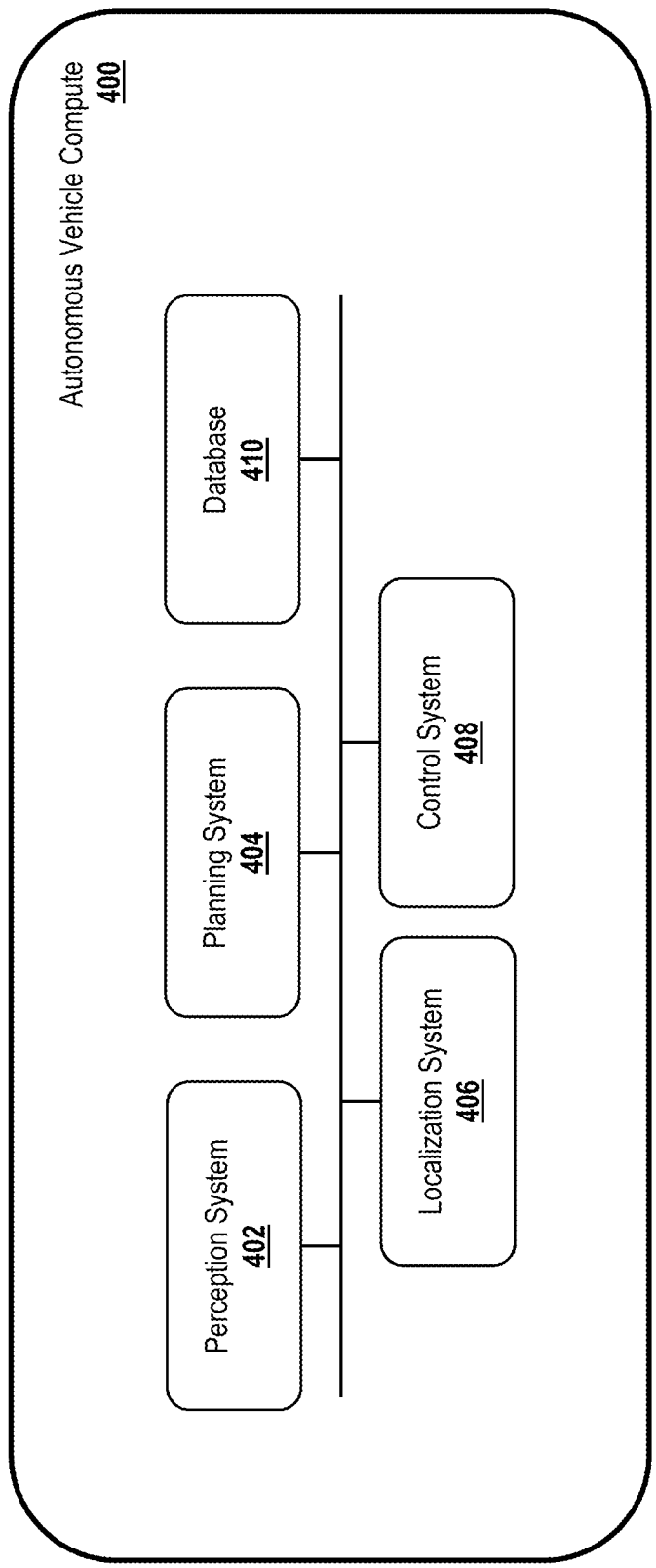
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
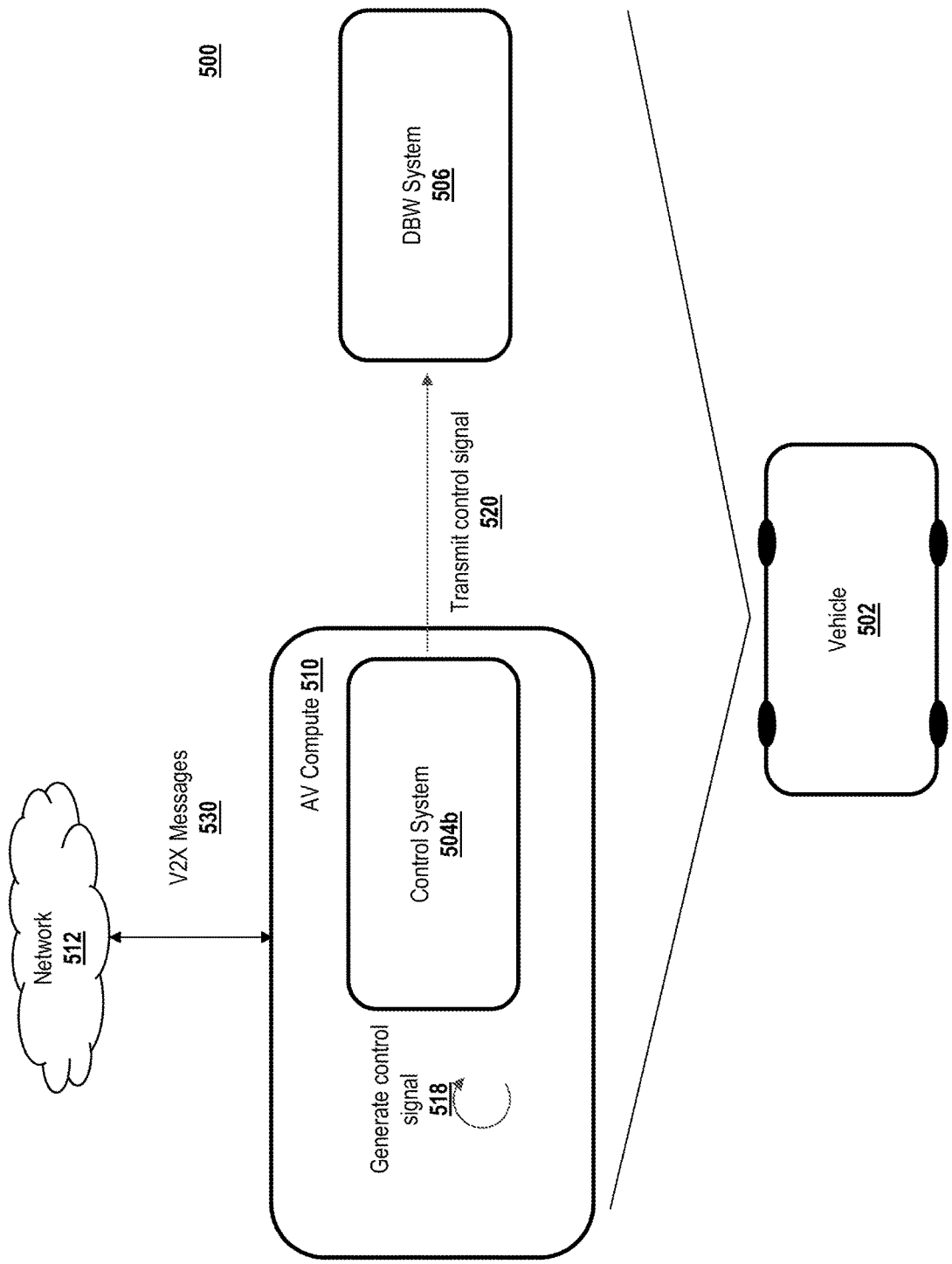
FIG. 5 is a diagram of an implementation of communicating precedence using vehicle to everything (V2X) messages.

Referring now to FIG. 5, illustrated is a diagram of an implementation 500 of communicating precedence using vehicle to everything (V2X) messages. In some embodiments, implementation 500 includes vehicle 502, autonomous vehicle compute 510, control system 504b, DBW system 506, and network 512. In some embodiments, vehicle 502 is the same as or similar to vehicles 102 of FIG. 1. In some embodiments, the autonomous vehicle compute 510 is the same as or similar to autonomous vehicle compute 202f of FIG. 2, or autonomous vehicle compute 400 of FIG. 4. In some embodiments, control system 504b is the same as or similar to control system 408 of FIG. 4. In some embodiments, DBW system 506 is the same as or similar to DBW system 202h of FIG. 2. In some embodiments, network 512 is the same as or similar to network 112 of FIG. 1.

In the example of FIG. 5, the AV compute 510 broadcasts and/or receives V2X messages 530 across network 512. In such an example, the AV compute 510 broadcasts and/or receives V2X messages 530 with other vehicles (e.g., vehicles 102b-102n of FIG. 1) using a V2I device, such as V2I device 110 of FIG. 1 that is communicatively coupled with network 512. In an example, the V2X message is a basic safety message (BSM). Table 1, below, lists signal fields of a V2X message.

TABLE 1

| V2X Message Fields | | |
| --- | --- | --- |
| Field Name | Value | Definition |
| Vehicle position | Latitude/Longitude | |
| Vehicle speed | +/− | |
| Vehicle angle | Degree from north | |
| Priority number | 0(not decided yet) 1/2/3/4~100 | Precedence order based on AV system |
| Ego vehicle stopped time | | Stopped time of ego vehicle figured out from ego vehicle itself based on Coordinated Universal Time (UTC) time |
| Remote vehicle stopped time | | Stopped time of remote vehicle figured out by AV system of ego vehicle based on sensor data and UTC time |
| Conflict Flag | −1 (Not checked)/ 0 (No)/1 (Yes) | Shows the conflict in priority number comparison |

In some embodiments, the V2X messages 530 include at least one outgoing message broadcasted by the AV compute 510. In such embodiments, the at least one outgoing message is associated with an upcoming intersection. The at least one outgoing message includes a respective priority number (e.g., initially determined based on the vehicle's own observations), a respective stopped time (e.g., the vehicle stopped time, a timestamp when the vehicle's velocity or distance from the stop line crossed below a threshold value), and a respective conflict flag (e.g., initially set to −1 to indicate the conflict hasn't been checked). In some examples, the outgoing messages include a single message containing each of the respective priority number, respective stopped time, and respective conflict flag generated by a current, host vehicle. In some examples, the outgoing messages include multiple messages each containing all or part of the respective priority number, respective stopped time, and respective conflict flag (e.g., updated at different times).

For ease of description, the vehicle 502 is referred to as a host vehicle, and broadcasts messages including a respective priority number, respective stopped time, and respective conflict flag of the host vehicle. The vehicle 502 receives priority numbers, stopped times, and conflict flags broadcast from other vehicles. Accordingly, the other vehicles broadcast their own respective priority number, respective stopped time, and respective conflict flag, and receive priority numbers, stopped times, and conflict flags from other vehicles. In some embodiments, the AV compute 510 determines the current intersection and/or other vehicles approaching the current intersection using at least one vehicle position (e.g., a respective vehicle position of the host vehicle, position received in messages from other vehicles). In some embodiments, the AV compute 510 determines vehicle positions using a map. In some embodiments, the AV compute 510 skips comparing a respective priority number with received priority numbers from other vehicles in response to determining that the received priority numbers are from vehicles at a different intersection. In some embodiments, the AV compute 510 ignores conflict flags from vehicles at other intersections.

In some embodiments, precedence refers to an order or sequence that governs traffic flow at an intersection. The precedence describes the order in which vehicles are entitled to cross the intersection based on right-of-way rules and general rules of the road. The rules compare various stopped times and positions of vehicle to confer an agreed upon order through the intersection. In an example, a vehicle that arrives at the intersection first has first precedence and a vehicle that arrives at the intersection second has second precedence. In an example, two vehicles arrive at the intersection substantially simultaneously and the vehicle to the right (e.g., counter-clockwise) has first precedence in locations where vehicles travel on the right side of the road. Other rules of the road apply to determining a first precedence when two vehicles arrive at the intersection substantially simultaneously.

Figure 6B:
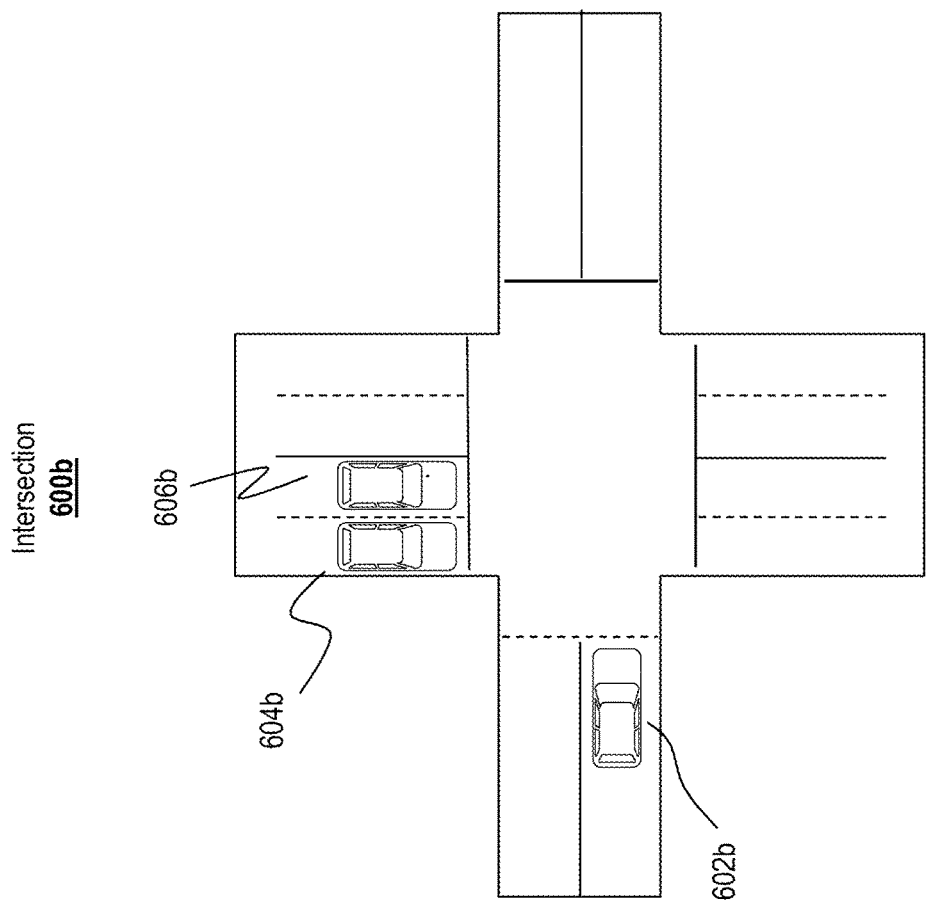
FIGS. 6A-6B are diagrams of example intersections for which precedence is communicated.
Figure 6A:
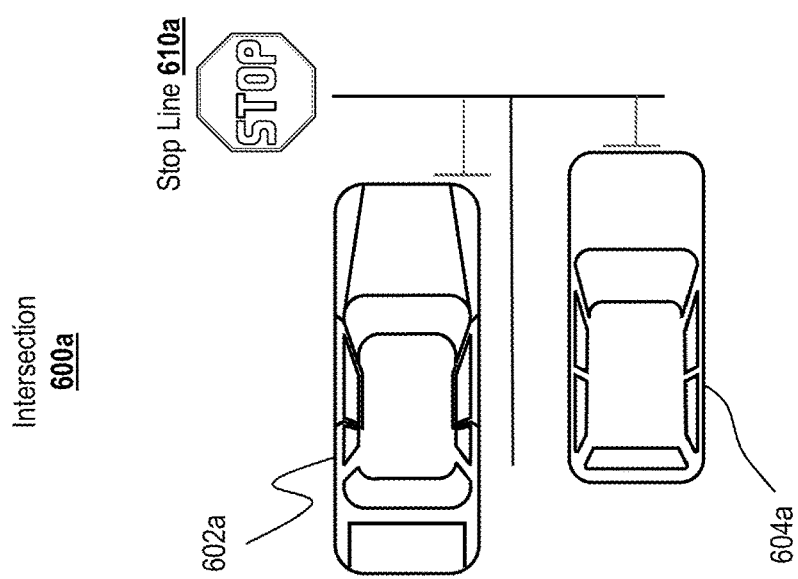

Referring now to FIG. 6A, illustrated is a diagram of an example intersection 600A with vehicles coming to a stop. In the example of FIG. 6A, a vehicle 602a and a vehicle 604a approach the intersection 600A. In some embodiments, vehicles 602a and 604a are the same as or similar to vehicles 102 of FIG. 1, or vehicle 502 of FIG. 5. In some embodiments, autonomous systems of the vehicles 602a and 604a determine precedence for crossing the intersection 600A based on entering a stopped status. In an example, the autonomous system determines the vehicle is in a stopped status in response to determining at least one threshold value is satisfied (e.g., distance from the stop line 610a, distance from a center point of the intersection 600A, vehicle speed data). When each autonomous system uses different threshold values, the autonomous system for each respective vehicle 602a and 604a can determine different precedence information. In an example, when vehicles 602a and 604a approach the intersection 600A almost simultaneously, each autonomous system determines that it arrived at the intersection first.

For example, at a first timestamp, the vehicle 602a is traveling at 0.5 kph and is 1 m from the stop line, while and the vehicle 604a is traveling at 0.1 kph and is 0.5 m from the stop line. The vehicle 602a determines, based on its respective autonomous system, that it is in a stopped status at the first timestamp based on its respectively defined condition for a stopped vehicle (e.g., velocity<=0.5 kph, distance from stop line<=1 m). The vehicle 604a determines that it is in a stopped status and the vehicle 602a is not in a stopped status at the first timestamp because the vehicle 602a does not meet the conditions of the vehicle 604a (e.g., velocity<=0.1 kph, distance from stop line<=0.5 m) for a stopped status. In examples, the differences in the conditions for a stopped status are due to varying vehicle software, hardware, or any combinations thereof. In these examples, the vehicles 602a and 604a have different precedence information and do not reach consensus. In some embodiments, the present techniques enable negotiation of the precedence information across varying autonomous system implementations.

Referring now to FIG. 6B, illustrated is a diagrams of an example intersection 600B for which precedence is communicated. In the example of FIG. 6B, a vehicle 602b a vehicle 604b, and a vehicle 606b approach the intersection 600B. In some embodiments, vehicles 602b, 604b, and 606b are the same as or similar to vehicles 102 of FIG. 1, vehicle 502 of FIG. 5, or the vehicles 602a and 604a of FIG. 6A. In some embodiments, autonomous systems of the vehicles 602b, 604b, and 606b decide precedence for the intersection 600B based on respective stopped times (e.g., times when the autonomous systems determines the ego vehicle has entered a stopped status).

In some embodiments, the vehicles 602b, 604b, and 606b broadcast V2X messages periodically (e.g., at predetermined intervals for the duration of a route). Tables 2-4, below, list example V2X messages broadcasted by vehicle A (e.g., vehicle 602b), vehicle B (e.g., vehicle 604b), and vehicle C (e.g., vehicle 606b) in an example of all vehicles reaching the same consensus priority order for navigation through the intersection 600b. In Tables 2-4, the ID refers to an identification assigned to each vehicle. The priority number is the identified vehicle's place in the precedence order; speed/position refers to the speed/position of the identified vehicle as determined by the host vehicle (e.g., the vehicle broadcasting the message); the stopped time (ego) identifies a respective stopped time of the host vehicle in Coordinated Universal Time (UTC); the stopped time (remote) is the stopped time associated with the other vehicles in UTC; and the conflict flag indicates known conflicts in priority at each respective vehicle.

TABLE 2

V2X Message Transmitted by Vehicle A

| ID | Priority number | Speed/ Position | Stopped time (Ego) | Stopped time (Remote) | Conflict flag |
|---|---|---|---|---|---|
| A | 2 | | 10:36:42.22 | | 0 |
| B | 1 | | | 10:36:41.24 | 0 |
| C | 3 | | | 10:36:42.95 | 0 |

TABLE 3

V2X Message Transmitted by Vehicle B

| ID | Priority number | Speed/ Position | Stopped time (Ego) | Stopped time (Remote) | Conflict flag |
|---|---|---|---|---|---|
| A | 2 | | | 10:36:42.28 | 0 |
| B | 1 | | 10:36:41.34 | | 0 |
| C | 3 | | | 10:36:43.04 | 0 |

TABLE 4

V2X Message Transmitted by Vehicle C

| ID | Priority number | Speed/ Position | Stopped time (Ego) | Stopped time (Remote) | Conflict flag |
|---|---|---|---|---|---|
| A | 2 | | | 10:36:42.30 | 0 |
| B | 1 | | | 10:36:41.24 | 0 |
| C | 3 | | 10:36:42.88 | | 0 |

In some embodiments, the autonomous systems of the vehicles 602b, 604b, and 606b each determine the same priority numbers for each vehicle (vehicles 602b has priority 2, 604b has priority 1, and 606b has priority 3). The autonomous systems determine a respective (i.e., ego) stopped time, and a remote stopped time for each other vehicle using onboard sensors.

In some embodiments, the autonomous systems of the vehicles 602b, 604b, and 606b do not determine the same priority numbers and do not reach consensus. In an example, the autonomous system of the vehicle 606b determines a respective priority number of 1 using its respective stopped time and the remote stopped times. In such an example, the autonomous system broadcasts a first V2X message with a respective priority number of 1, its respective stopped time, and a respective conflict flag of 0. In an example, the autonomous system receives a V2X message from vehicle 604b with a respective priority number of vehicle 604b as 1. In such an example, the autonomous system determines a priority conflict with vehicle 604b. The autonomous system broadcasts a conflict flag in response to determining a conflict. Tables 5-7, below, list example V2X messages broadcasted by vehicle A (e.g., vehicle 602b), vehicle B (e.g., vehicle 604b), and vehicle C (e.g., vehicle 606b) in an example of a conflict.

TABLE 5

V2X Message Transmitted by Vehicle A

| ID | Priority number | Speed/ Position | Stopped time (Ego) | Stopped time (Remote) | Conflict flag |
|---|---|---|---|---|---|
| A | 2 | | 10:36:42.22 | | 0 |
| B | 1 | | | 10:36:41.24 | 0 |
| C | 3 | | | 10:36:42.95 | 1 |

TABLE 6

V2X Message Transmitted by Vehicle B

| ID | Priority number | Speed/ Position | Stopped time (Ego) | Stopped time (Remote) | Conflict flag |
|---|---|---|---|---|---|
| A | 2 | | | 10:36:42.28 | 0 |
| B | 1 | | 10:36:41.34 | | 0 |
| C | 3 | | | 10:36:43.04 | 1 |

TABLE 5

V2X Message Transmitted by Vehicle C

| ID | Priority number | Speed/ Position | Stopped time (Ego) | Stopped time (Remote) | Conflict flag |
|---|---|---|---|---|---|
| A | 3 | | | 10:36:42.30 | 0 |
| B | 2 | | | 10:36:41.85 | 0 |
| C | 1 | | 10:36:41.75 | | 1 |

The autonomous system of vehicle 606b determines that its respective priority number conflicts with the priority number received from vehicle 604b, and sets its conflict flag to 1 to indicate a conflict. In some embodiments, the autonomous system of the vehicle 604b while set its conflict flag to 1 in response to receiving the message from vehicle 606b.

Figure 7:
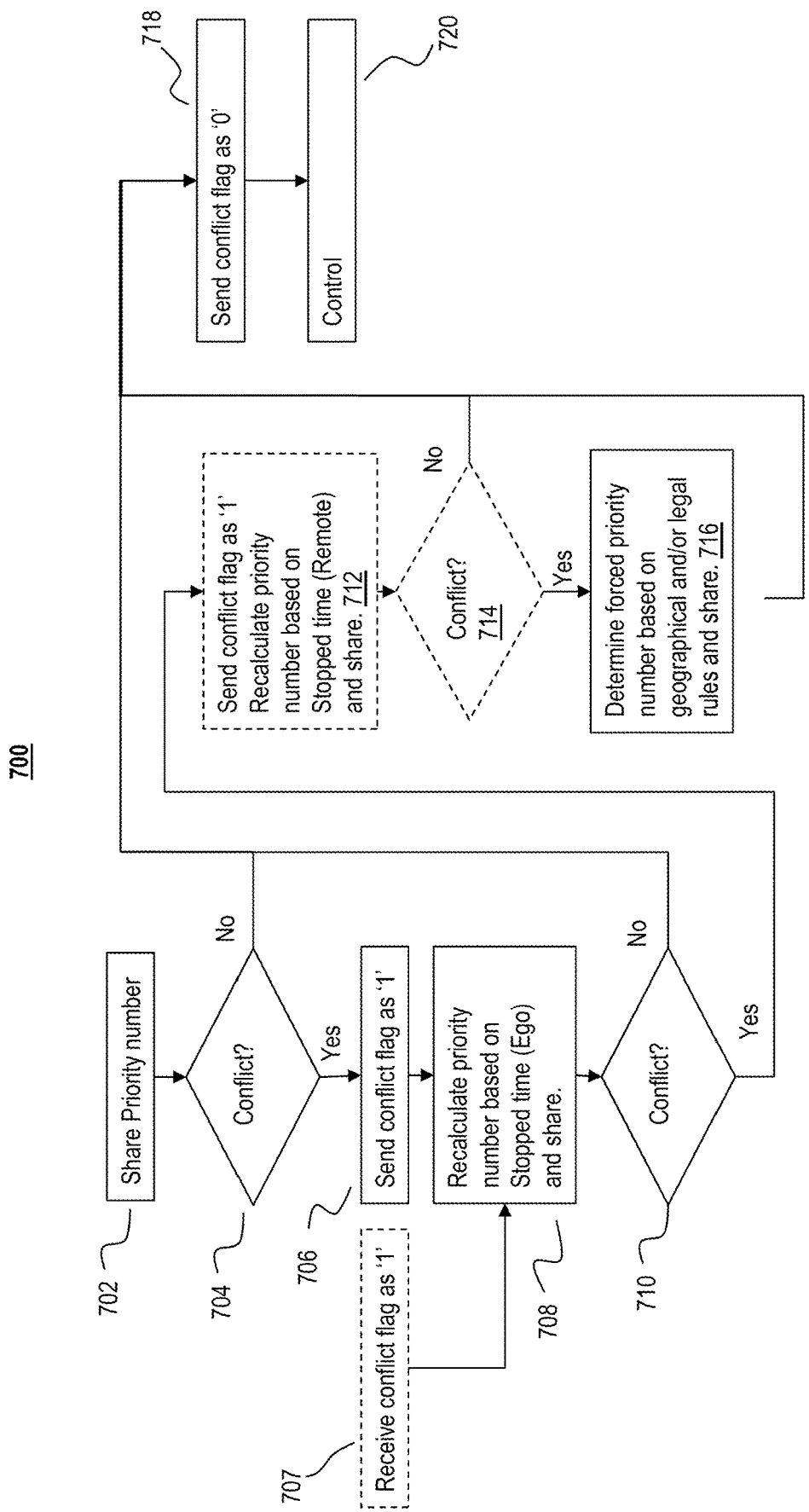
FIG. 7 is a flowchart of a process for responding to a priority conflict.

FIG. 7 is an example flow diagram of a process 700 of responding to a priority conflict. In some embodiments, process 700 is implemented (e.g., completely, partially, etc.) using a AV compute that is the same as or similar to autonomous vehicle compute 202f of FIG. 2, autonomous vehicle compute 400 of FIG. 4, or AV compute 510 of FIG. 5. In some embodiments, one or more of the steps of process 700 are performed (e.g., completely, partially, and/or the like) by another device or system, or another group of devices and/or systems that are separate from, or include, the planning system. In an example, one or more steps of process 700 is performed (e.g., completely, partially, and/or the like) by remote AV system 114, and/or vehicle 200 (e.g., autonomous system 202 of vehicle 200). In some embodiments, the steps of process 700 are performed between any of the above-noted systems in cooperation with one another.

The autonomous system (e.g., AV compute 510 of FIG. 5) broadcasts its respective priority number (block 702). In an example, the autonomous system broadcasts a V2X message including its respective priority number based on its respective stopped time.

The autonomous system determines whether there is a conflict (block 704). In an example, the autonomous system determines whether its respective priority number conflicts with (e.g., is the same as) any other priority number. In such an example, the autonomous system determines the priority numbers based on respective and remote stopped times calculated by the autonomous system. The autonomous system compares the priority numbers it determined with priority number received from other vehicles (e.g., by receiving V2X messages). If the autonomous system determines there is not a conflict, the process 700 follows the no branch to step 718. If the autonomous system determines there is a conflict, the process 700 follows the yes branch to step 706.

In response to determining to there is a conflict, the autonomous system sends a message with the conflict flag as "1". In an example, the conflict flag is broadcast as part of a V2X messaging including the respective stopped time for the autonomous system.

The autonomous system optionally receives a message with the conflict flag as "1" (block 707). In an example, another autonomous system determines a conflict using the respective priority number broadcasted at step 702 (e.g., before the current autonomous system has compared the priority numbers). The received conflict flag is a part of a received V2X message which includes a stopped time for the other vehicle (e.g., determined by the other autonomous system).

The autonomous system recalculates at least one priority number (e.g., the respective priority number and/or priority numbers for other vehicles) using the respective stopped time and broadcasts the at least one priority number (block 708). In an example, the autonomous system compares the respective stopped time with a stopped time for the other vehicle in the received V2X message.

The autonomous system determines whether there is a conflict (block 710). In an example, the autonomous system determines whether its respective priority number conflicts with any other priority number. If the autonomous system determines there is not a conflict, the process 700 follows the no branch to step 718. If the autonomous system determines there is a conflict, the process 700 follows the yes branch to optional step 712. If the optional steps 712 and 714 are skipped, the process 700 follows the yes branch to step 716.

The autonomous system optionally sends a message with the conflict flag as "1" and recalculates at least one priority number (block 712). In an example, the autonomous system recalculates the at least one priority number using stopped times received from other vehicles. In some embodiments, the autonomous system determines the at least one priority number using an average of stopped times received from at least one other vehicle (e.g., each vehicle approaching the intersection). In some embodiments, the autonomous system averages two or more stopped times for at least one vehicle. In an example, a respective stopped time determined by the autonomous system for a vehicle is averaged with at least one received stopped time for the vehicle. In an example, the autonomous system averages stopped times received from two or more other vehicles. In some embodiments, the autonomous system sends a message with the recalculated at least one priority number.

The autonomous system optionally determines whether there is a conflict (block 714). If the autonomous system determines there is not a conflict, the process 700 follows the no branch to step 718. If the autonomous system determines there is a conflict, the process 700 follows the yes branch to step 716.

The autonomous system determines at least one forced priority number using geographical and/or legal rules (block 716). In an example, autonomous system determines there is a tie score using two or more stopped times (e.g., a respective stopped time determined by the autonomous system and a received stopped time are the same). In an example, the geographical and/or legal rules include determining the priority order using cardinal directions (e.g., north to south, east to west). In an example, the geographical and/or legal rules include determining the priority order as clockwise and/or counterclockwise. In such an example, if there are vehicles at the 3 o'clock position, the 6 o'clock position, and the 9 o'clock position, the autonomous system determines that the vehicle at the 3 o'clock position has first priority, the vehicle at the 6 o'clock position has second priority, and the vehicle at the 9 o'clock position has third priority.

The autonomous system sends a message with the conflict flag as "0" (block 718). In an example, the autonomous system sets the conflict flag as "0" in response to determining there are no conflicting priority numbers.

The autonomous system returns control (block 720). In an example, the autonomous system returns control to a control system that is the same as or similar to control system 504b. In such an example, the vehicle traverses the intersection according to the determined priority numbers.

In some embodiments, when there is a priority conflict, the autonomous system determines whether the priority conflict is an adversarial conflict from an adversarial vehicle. For example, the autonomous system can determine that another vehicle purposefully included false information in V2X messages. The false information could include a stopped time that is earlier than it should be, or a priority number that is lower it should be. In examples, the adversarial conflict is based on the false or incorrect information in the V2X messages. A vehicle that generates the false or incorrect information in the V2X messages is an adversarial vehicle. In some embodiments, the autonomous system operates in a different manner when the autonomous system determines the priority conflict is adversarial. In such embodiments, the vehicle engages the intersection in a different manner. In an example, the vehicle yields to the adversarial vehicle. In an example, the autonomous system determines whether the vehicle can safely traverse the intersection before the adversarial vehicle. In such an example, the vehicle traverses the intersection according to its determined priority number when it can safely do so.

Figure 8:
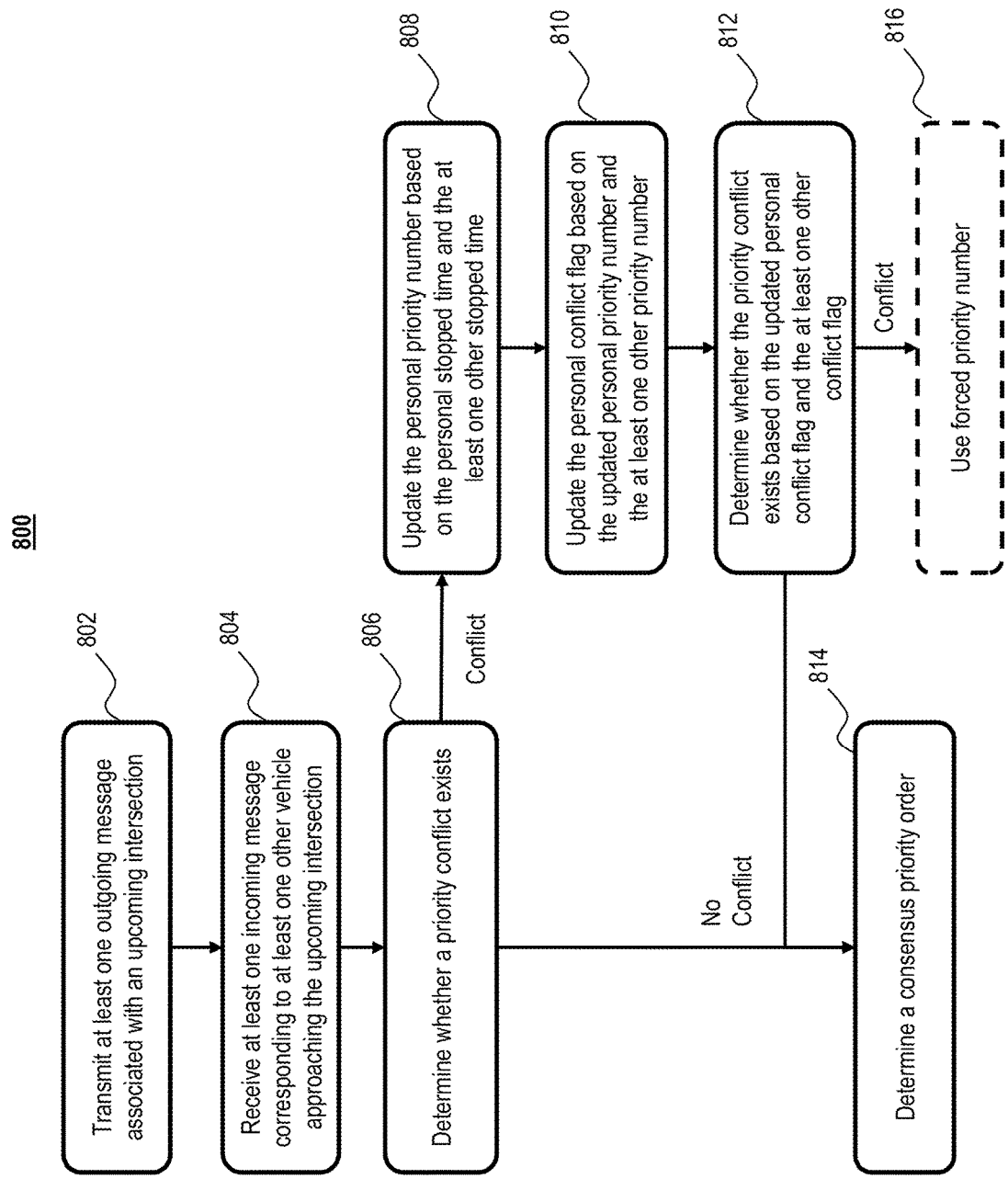
FIG. 8 is a flowchart of a process for communicating precedence using V2X messages.

Referring now to FIG. 8, illustrated is a flowchart of a process 800 for communicating precedence using V2X messages. In some embodiments, one or more of the steps described with respect to process 800 are performed (e.g., completely, partially, and/or the like) by autonomous system 200. Additionally, or alternatively, in some embodiments one or more steps described with respect to process 800 are performed (e.g., completely, partially, and/or the like) by another device or group of devices separate from or including autonomous system 200 such as device 300 of FIG. 3, AV compute 400 of FIG. 4, and AV compute 510 of FIG. 5.

The autonomous system (e.g., autonomous system 202f of FIG. 2) broadcasts at least one outgoing message associated with an upcoming intersection (block 802). In an example, the autonomous system broadcasts a single message containing all of the information. In an example, the autonomous system broadcasts multiple messages containing all or part of the information updated at different times. In some embodiments, the at least one outgoing message includes a respective priority number (e.g., initially determined based on the vehicle's own observations), a respective stopped time (e.g., a timestamp when the vehicles velocity or distance from the stop line crossed below a threshold value), and/or a respective conflict flag (e.g., initially set to −1 to indicate the conflict hasn't been checked).

The autonomous system receives at least one incoming message (e.g., a single message from a single other vehicle, multiple messages from a single other vehicle, or multiple messages from multiple other vehicles) corresponding to at least one other vehicle approaching the upcoming intersection (block 804). In some embodiments, the at least one incoming message includes at least one other priority number (e.g., initially determined based on the other vehicle's own observations, or updated based on the priority number in the broadcasted message). In an example, the at least one incoming message includes a message received at a first time indicating the other vehicle's initial priority number, and a second messaged received at a second time indicating the other vehicle's updated priority number. In some embodiments, the at least one incoming message includes at least one other stopped time and/or at least one other conflict flag.

The autonomous system determines whether a priority conflict exists (block 806). In an example, the autonomous system determines its respective priority number conflicts with a received priority number and sets the respective conflict flag to "1". In an example, the autonomous system receives a message including a conflict flag set to "1". If the autonomous system determines there is not a conflict, the process 700 follows the no conflict branch to block 814. If the autonomous system determines there is a conflict, the process 700 follows the conflict branch to block 808.

The autonomous system updates the respective priority number based on the respective stopped time and the at least one other stopped time (block 808). In an example, the autonomous system receives the at least one other stopped time from at least one other vehicle.

The autonomous system updates the respective conflict flag based on the updated respective priority number and the at least one other priority number (block 810). In an example, the autonomous system determines whether the vehicle's updated priority number conflict with the received priority number. If there is a conflict, the autonomous system sets the respective conflict flag to "1".

The autonomous system determines whether the priority conflict exists based on the updated respective conflict flag and the at least one other conflict flag (block 812). In an example, the autonomous system determines whether there is still a conflict after trying to resolve the conflict by updating the respective priority number. If the autonomous system determines there is not a conflict, the process 700 follows the no conflict branch to step 814. If the autonomous system determines there is still a conflict, autonomous system the process 700 optionally follows the conflict branch to step 816. In an example, the autonomous system relies on a fallback strategy to resolve the priority conflict (e.g., by using a geographical and/or legal rule).

The autonomous system determines a consensus priority order (block 812). In an example, the autonomous system determines a consensus priority order when there is no priority conflict (e.g., all conflict flags are "0"). In some embodiments, the autonomous system controls the vehicle to traverse the intersection according to the consensus priority order.

The autonomous system optionally uses at least one forced priority number when there is a conflict (block 716). In an example, the autonomous system determines the least one forced priority number using geographical and/or legal rules.

According to some non-limiting embodiments or examples, provided is a method comprising: broadcasting, with at least one processor, at least one outgoing message associated with an upcoming intersection, the at least one outgoing message comprising a respective priority number, a respective stopped time, and a respective conflict flag; receiving, with the at least one processor, at least one incoming message to at least one other vehicle approaching the upcoming intersection, the at least one incoming message comprising at least one other priority number, at least one other stopped time, and at least one other conflict flag; determining, with the at least one processor, whether a priority conflict exists based on the respective conflict flag and the at least one other conflict flag; in response to determining that the priority conflict exists: updating, with the at least one processor, the respective priority number based on the respective stopped time and the at least one other stopped time; updating, with the at least one processor, the respective conflict flag based on the updated respective priority number and the at least one other priority number; and determining, with the at least one processor, whether the priority conflict exists based on the updated respective conflict flag and the at least one other conflict flag; and in response to determining that the priority conflict does not exist, determining a consensus priority order.

According to some non-limiting embodiments or examples, provided is a system comprising at least one processor, and at least one non-transitory storage media storing instructions that, when executed by the at least one processor, cause the at least one processor to: broadcast at least one outgoing message associated with an upcoming intersection, the at least one outgoing message comprising a respective priority number, a respective stopped time, and a respective conflict flag; receive at least one incoming message to at least one other vehicle approaching the upcoming intersection, the at least one incoming message comprising at least one other priority number, at least one other stopped time, and at least one other conflict flag; determine whether a priority conflict exists based on the respective conflict flag and the at least one other conflict flag; in response to determining that the priority conflict exists: update the respective priority number based on the respective stopped time and the at least one other stopped time; update the respective conflict flag based on the updated respective priority number and the at least one other priority number; and determine whether the priority conflict exists based on the updated respective conflict flag and the at least one other conflict flag; and in response to determining that the priority conflict does not exist, determine a consensus priority order.

According to some non-limiting embodiments or examples, provided is at least one non-transitory storage media storing instructions that, when executed by at least one processor, cause the at least one processor to: broadcast at least one outgoing message associated with an upcoming intersection, the at least one outgoing message comprising a respective priority number, a respective stopped time, and a respective conflict flag; receive at least one incoming message to at least one other vehicle approaching the upcoming intersection, the at least one incoming message comprising at least one other priority number, at least one other stopped time, and at least one other conflict flag; determine whether a priority conflict exists based on the respective conflict flag and the at least one other conflict flag; in response to determining that the priority conflict exists: update the respective priority number based on the respective stopped time and the at least one other stopped time; update the respective conflict flag based on the updated respective priority number and the at least one other priority number; and determine whether the priority conflict exists based on the updated respective conflict flag and the at least one other conflict flag; and in response to determining that the priority conflict does not exist, determine a consensus priority order.

Further non-limiting aspects or embodiments are set forth in the following numbered clauses:

Clause 1: A method, comprising: broadcasting, with at least one processor, at least one outgoing message associated with an upcoming intersection, the at least one outgoing message comprising a respective priority number, a respective stopped time, and a respective conflict flag; receiving, with the at least one processor, at least one incoming message to at least one other vehicle approaching the upcoming intersection, the at least one incoming message comprising at least one other priority number, at least one other stopped time, and at least one other conflict flag; determining, with the at least one processor, whether a priority conflict exists based on the respective conflict flag and the at least one other conflict flag; in response to determining that the priority conflict exists: updating, with the at least one processor, the respective priority number based on the respective stopped time and the at least one other stopped time; updating, with the at least one processor, the respective conflict flag based on the updated respective priority number and the at least one other priority number; and determining, with the at least one processor, whether the priority conflict exists based on the updated respective conflict flag and the at least one other conflict flag; and in response to determining that the priority conflict does not exist, determining a consensus priority order.

Clause 2: The method of clause 1, wherein broadcasting the at least one outgoing message comprises: determining at least one estimated stop time for the at least one other vehicle; and determining the respective priority number based on the respective stopped time and the at least one estimated stop time.

Clause 3: The method of clauses 1 or 2, wherein determining whether the priority conflict exists based on the respective conflict flag and the at least one other conflict flag comprises: determining the respective priority number for the upcoming intersection; determining whether the respective priority number conflicts with the at least one other priority number from the at least one other vehicle approaching the upcoming intersection; and in response to determining that the respective priority number conflicts with the at least one other priority number, updating the respective conflict flag to indicate that a conflict exists between the respective priority number and the at least one other priority number from at least one other vehicle.

Clause 4: The method of any of clauses 1-3, wherein broadcasting the at least one outgoing message comprises: broadcasting an updated outgoing message comprising the updated respective priority number and the updated respective conflict flag.

Clause 5: The method of any of clauses 1-4, wherein updating the respective conflict flag based on the updated respective priority number and the at least one other priority number comprises: receiving another incoming message comprising at least one updated other priority number; and updating the respective conflict flag based on the updated respective priority number and the at least one updated other priority number.

Clause 6: The method of any of clauses 1-5, wherein determining whether the priority conflict exists based on the updated respective conflict flag and the at least one other conflict flag comprises: receiving another incoming message comprising at least one updated other conflict flag; and determining whether the priority conflict exists based on the updated respective conflict flag and the at least one updated other conflict flag.

Clause 7: The method of any of clauses 1-6, wherein determining whether the priority conflict exists comprises: determining that the updated respective priority number conflicts with the at least one other priority number; and updating the respective priority number based on at least one average estimated stopped time.

Clause 8: The method of any of clauses 1-7, wherein updating the respective priority number comprises: determining a forced priority number based on a predetermined rule.

Clause 9: The method of any of clauses 1-8, the method further comprising: in response to determining that the priority conflict does not exist, traversing the upcoming intersection according to the respective priority number.

Clause 10: The method of any of clauses 1-9, the method further comprising: in response to determining that the priority conflict does exist, determining whether the priority conflict is an adversarial conflict; and in response to determining that the priority conflict is an adversarial conflict, operating according to the adversarial conflict.

Clause 11: A system, comprising: at least one processor, and at least one non-transitory storage media storing instructions that, when executed by the at least one processor, cause the at least one processor to: broadcast at least one outgoing message associated with an upcoming intersection, the at least one outgoing message comprising a respective priority number, a respective stopped time, and a respective conflict flag; receive at least one incoming message to at least one other vehicle approaching the upcoming intersection, the at least one incoming message comprising at least one other priority number, at least one other stopped time, and at least one other conflict flag; determine whether a priority conflict exists based on the respective conflict flag and the at least one other conflict flag; in response to determining that the priority conflict exists: update the respective priority number based on the respective stopped time and the at least one other stopped time; update the respective conflict flag based on the updated respective priority number and the at least one other priority number; and determine whether the priority conflict exists based on the updated respective conflict flag and the at least one other conflict flag; and in response to determining that the priority conflict does not exist, determine a consensus priority order.

Clause 12: The system of clause 11, wherein the instructions that cause the at least one processor to broadcast the at least one outgoing message cause the at least one processor to: determine at least one estimated stop time for the at least one other vehicle; and determine the respective priority number based on the respective stopped time and the at least one estimated stop time.

Clause 13: The system of clauses 11 or 12, wherein the instructions that cause the at least one processor to determine whether the priority conflict exists based on the respective conflict flag and the at least one other conflict flag cause the at least one processor to: determine the respective priority number for the upcoming intersection; determine whether the respective priority number conflicts with the at least one other priority number from the at least one other vehicle approaching the upcoming intersection; and in response to determining that the respective priority number conflicts with the at least one other priority number, update the respective conflict flag to indicate that a conflict exists between the respective priority number and the at least one other priority number from at least one other vehicle.

Clause 14: The system of any of clauses 11-13, wherein the instructions that cause the at least one processor to broadcast the at least one outgoing message cause the at least one processor to: broadcast an updated outgoing message comprising the updated respective priority number and the updated respective conflict flag.

Clause 15: The system of any of clauses 11-14, wherein the instructions that cause the at least one processor to update the respective conflict flag based on the updated respective priority number and the at least one other priority number cause the at least one processor to: receive another incoming message comprising at least one updated other priority number; and update the respective conflict flag based on the updated respective priority number and the at least one updated other priority number.

Clause 16: The system of any of clauses 11-15, wherein the instructions that cause the at least one processor to determine whether the priority conflict exists based on the updated respective conflict flag and the at least one other conflict flag cause the at least one processor to: receive another incoming message comprising at least one updated other conflict flag; and determine whether the priority conflict exists based on the updated respective conflict flag and the at least one updated other conflict flag.

Clause 17: The system of any of clauses 11-16, wherein the instructions that cause the at least one processor to determine whether the priority conflict exists cause the at least one processor to: determine that the updated respective priority number conflicts with the at least one other priority number; and update the respective priority number based on at least one average estimated stopped time.

Clause 18: At least one non-transitory storage media storing instructions that, when executed by at least one processor, cause the at least one processor to: broadcast at least one outgoing message associated with an upcoming intersection, the at least one outgoing message comprising a respective priority number, a respective stopped time, and a respective conflict flag; receive at least one incoming message to at least one other vehicle approaching the upcoming intersection, the at least one incoming message comprising at least one other priority number, at least one other stopped time, and at least one other conflict flag; determine whether a priority conflict exists based on the respective conflict flag and the at least one other conflict flag; in response to determining that the priority conflict exists: update the respective priority number based on the respective stopped time and the at least one other stopped time; update the respective conflict flag based on the updated respective priority number and the at least one other priority number; and determine whether the priority conflict exists based on the updated respective conflict flag and the at least one other conflict flag; and in response to determining that the priority conflict does not exist, determine a consensus priority order.

Clause 19: The at least one non-transitory storage media of clause 18, wherein the instructions that cause the at least one processor to broadcast the at least one outgoing message cause the at least one processor to: determine at least one estimated stop time for the at least one other vehicle; and determine the respective priority number based on the respective stopped time and the at least one estimated stop time.

Clause 20: The at least one non-transitory storage media of clauses 18 or 19, wherein the instructions that cause the at least one processor to determine whether the priority conflict exists based on the respective conflict flag and the at least one other conflict flag cause the at least one processor to: determine the respective priority number for the upcoming intersection; determine whether the respective priority number conflicts with the at least one other priority number from the at least one other vehicle approaching the upcoming intersection; and in response to determining that the respective priority number conflicts with the at least one other priority number, update the respective conflict flag to indicate that a conflict exists between the respective priority number and the at least one other priority number from at least one other vehicle.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
    broadcasting, with at least one processor, at least one outgoing message associated with an upcoming intersection, the at least one outgoing message comprising a respective priority number, a respective stopped time, and a respective conflict flag;
    receiving, with the at least one processor, at least one incoming message from at least one other vehicle approaching the upcoming intersection, the at least one incoming message comprising at least one other priority number, at least one other stopped time, and at least one other conflict flag;
    determining, with the at least one processor, whether a priority conflict exists based on the respective conflict flag and the at least one other conflict flag;
    in response to determining that the priority conflict exists:
        updating, with the at least one processor, the respective priority number based on the respective stopped time and the at least one other stopped time;
        updating, with the at least one processor, the respective conflict flag based on the updated respective priority number and the at least one other priority number; and
        determining, with the at least one processor, whether the priority conflict exists based on the updated respective conflict flag and the at least one other conflict flag; and
    in response to determining that the priority conflict does not exist, determining a consensus priority order.

2. The method of claim 1, wherein broadcasting the at least one outgoing message comprises:
    determining at least one estimated stop time for the at least one other vehicle; and
    determining the respective priority number based on the respective stopped time and the at least one estimated stop time.

3. The method of claim 1, wherein determining whether the priority conflict exists based on the respective conflict flag and the at least one other conflict flag comprises:
    determining the respective priority number for the upcoming intersection;
    determining whether the respective priority number conflicts with the at least one other priority number from the at least one other vehicle approaching the upcoming intersection; and
    in response to determining that the respective priority number conflicts with the at least one other priority number, updating the respective conflict flag to indicate that a conflict exists between the respective priority number and the at least one other priority number from at least one other vehicle.

4. The method of claim 1, wherein broadcasting the at least one outgoing message comprises:
    broadcasting an updated outgoing message comprising the updated respective priority number and the updated respective conflict flag.

5. The method of claim 1, wherein updating the respective conflict flag based on the updated respective priority number and the at least one other priority number comprises:
    receiving another incoming message comprising at least one updated other priority number; and
    updating the respective conflict flag based on the updated respective priority number and the at least one updated other priority number.

6. The method of claim 1, wherein determining whether the priority conflict exists based on the updated respective conflict flag and the at least one other conflict flag comprises:
    receiving another incoming message comprising at least one updated other conflict flag; and
    determining whether the priority conflict exists based on the updated respective conflict flag and the at least one updated other conflict flag.

7. The method of claim 1, wherein determining whether the priority conflict exists comprises:
    determining that the updated respective priority number conflicts with the at least one other priority number; and
    updating the respective priority number based on at least one average estimated stopped time.

8. The method of claim 1, wherein updating the respective priority number comprises:
    determining a forced priority number based on a predetermined rule.

9. The method of claim 1, the method further comprising:
    in response to determining that the priority conflict does not exist, traversing the upcoming intersection according to the respective priority number.

10. The method of claim 1, the method further comprising:

in response to determining that the priority conflict does exist, determining whether the priority conflict is an adversarial conflict; and in response to determining that the priority conflict is an adversarial conflict, operating according to the adversarial conflict.

11. A system, comprising:

at least one processor, and at least one non-transitory storage media storing instructions that, when executed by the at least one processor, cause the at least one processor to:

broadcast at least one outgoing message associated with an upcoming intersection, the at least one outgoing message comprising a respective priority number, a respective stopped time, and a respective conflict flag;

receive at least one incoming message from at least one other vehicle approaching the upcoming intersection, the at least one incoming message comprising at least one other priority number, at least one other stopped time, and at least one other conflict flag;

determine whether a priority conflict exists based on the respective conflict flag and the at least one other conflict flag;

in response to determining that the priority conflict exists:

update the respective priority number based on the respective stopped time and the at least one other stopped time;

update the respective conflict flag based on the updated respective priority number and the at least one other priority number; and determine whether the priority conflict exists based on the updated respective conflict flag and the at least one other conflict flag; and in response to determining that the priority conflict does not exist, determine a consensus priority order.

12. The system of claim 11, wherein the instructions that cause the at least one processor to broadcast the at least one outgoing message cause the at least one processor to:

determine at least one estimated stop time for the at least one other vehicle; and determine the respective priority number based on the respective stopped time and the at least one estimated stop time.

13. The system of claim 11, wherein the instructions that cause the at least one processor to determine whether the priority conflict exists based on the respective conflict flag and the at least one other conflict flag cause the at least one processor to:

determine the respective priority number for the upcoming intersection;

determine whether the respective priority number conflicts with the at least one other priority number from the at least one other vehicle approaching the upcoming intersection; and in response to determining that the respective priority number conflicts with the at least one other priority number, update the respective conflict flag to indicate that a conflict exists between the respective priority number and the at least one other priority number from at least one other vehicle.

14. The system of claim 11, wherein the instructions that cause the at least one processor to broadcast the at least one outgoing message cause the at least one processor to:

broadcast an updated outgoing message comprising the updated respective priority number and the updated respective conflict flag.

15. The system of claim 11, wherein the instructions that cause the at least one processor to update the respective conflict flag based on the updated respective priority number and the at least one other priority number cause the at least one processor to:

receive another incoming message comprising at least one updated other priority number; and update the respective conflict flag based on the updated respective priority number and the at least one updated other priority number.

16. The system of claim 11, wherein the instructions that cause the at least one processor to determine whether the priority conflict exists based on the updated respective conflict flag and the at least one other conflict flag cause the at least one processor to:

receive another incoming message comprising at least one updated other conflict flag; and determine whether the priority conflict exists based on the updated respective conflict flag and the at least one updated other conflict flag.

17. The system of claim 11, wherein the instructions that cause the at least one processor to determine whether the priority conflict exists cause the at least one processor to:

determine that the updated respective priority number conflicts with the at least one other priority number; and update the respective priority number based on at least one average estimated stopped time.

18. At least one non-transitory storage media storing instructions that, when executed by at least one processor, cause the at least one processor to:

broadcast at least one outgoing message associated with an upcoming intersection, the at least one outgoing message comprising a respective priority number, a respective stopped time, and a respective conflict flag;

receive at least one incoming message from at least one other vehicle approaching the upcoming intersection, the at least one incoming message comprising at least one other priority number, at least one other stopped time, and at least one other conflict flag;

determine whether a priority conflict exists based on the respective conflict flag and the at least one other conflict flag;

in response to determining that the priority conflict exists:

update the respective priority number based on the respective stopped time and the at least one other stopped time;

update the respective conflict flag based on the updated respective priority number and the at least one other priority number; and determine whether the priority conflict exists based on the updated respective conflict flag and the at least one other conflict flag; and in response to determining that the priority conflict does not exist, determine a consensus priority order.

19. The at least one non-transitory storage media of claim 18, wherein the instructions that cause the at least one processor to broadcast the at least one outgoing message cause the at least one processor to:

determine at least one estimated stop time for the at least one other vehicle; and determine the respective priority number based on the respective stopped time and the at least one estimated stop time.

20. The at least one non-transitory storage media of claim 18, wherein the instructions that cause the at least one processor to determine whether the priority conflict exists based on the respective conflict flag and the at least one other conflict flag cause the at least one processor to:
- determine the respective priority number for the upcoming intersection;
- determine whether the respective priority number conflicts with the at least one other priority number from the at least one other vehicle approaching the upcoming intersection; and
- in response to determining that the respective priority number conflicts with the at least one other priority number, update the respective conflict flag to indicate that a conflict exists between the respective priority number and the at least one other priority number from at least one other vehicle.

21. The method of claim 1, wherein each respective priority number is based on the stopped time and position of the vehicle.

22. The method of claim 1, wherein the conflict flag indicates whether a priority conflict is known to exist with any other vehicle at the intersection, is known to not exist with any other vehicle at the intersection, or is unknown whether to exist or not exist.

* * * * *